Oct. 12, 1926.    1,602,576
E. M. GANT
PROCESS OF ROASTING COFFEE AND APPARATUS THEREFOR
Filed August 20, 1925    2 Sheets-Sheet 1
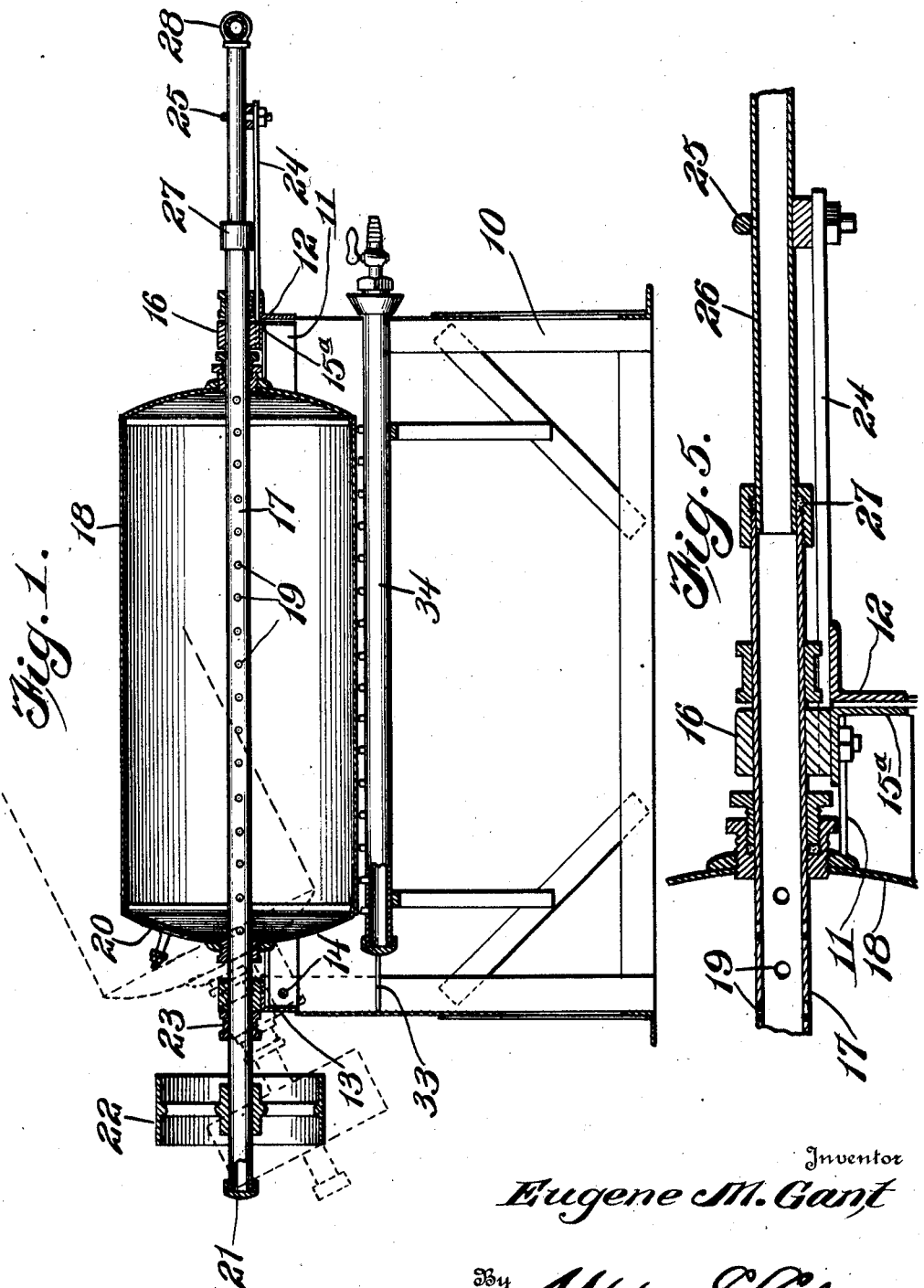
Inventor
Eugene M. Gant
By Watson E. Coleman
Attorney Oct. 12, 1926. 1,602,576
E. M. GANT
PROCESS OF ROASTING COFFEE AND APPARATUS THEREFOR
Filed August 20, 1925 2 Sheets-Sheet 2
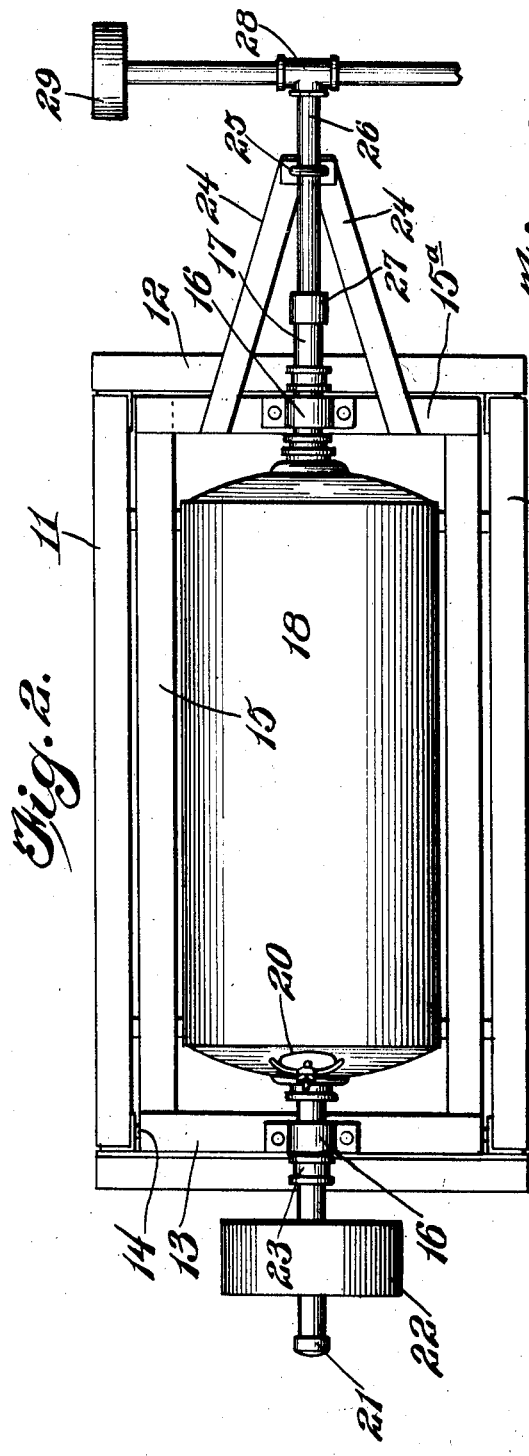
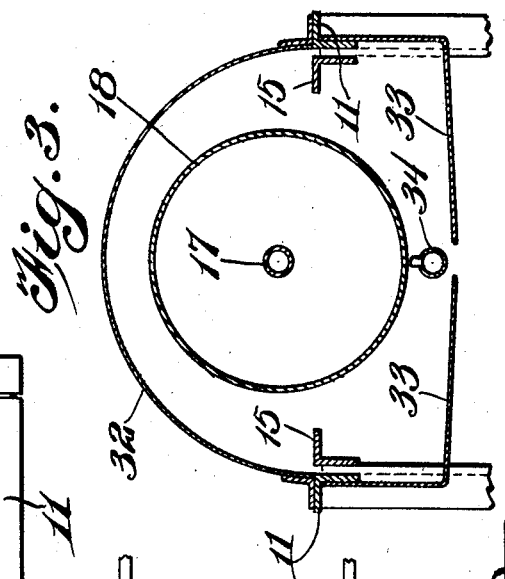
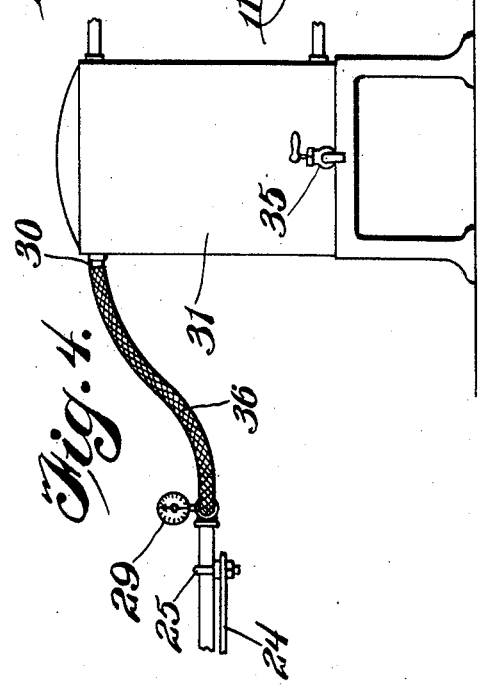
Inventor.
Eugene M. Gant
By Watson E. Coleman
Attorney Patented Oct. 12, 1926.

1,602,576

UNITED STATES PATENT OFFICE.

EUGENE M. GANT, OF NASHVILLE, TENNESSEE.

PROCESS OF ROASTING COFFEE AND APPARATUS THEREFOR.

Application filed August 20, 1925. Serial No. 51,450.

This invention relates to a process of roasting coffee and apparatus therefor.

An important object of the invention is to provide a process of roasting coffee by means of which the flavor of the coffee is improved and the loss by weight sustained is considerably lessened.

More specifically, the object of this invention is to provide apparatus whereby coffee may be roasted under a predetermined pressure produced by vaporization of the liquid contained in green coffee and this pressure maintained uniformly throughout the roasting operation, excess vapors being withdrawn to maintain the uniform pressure and condensed and by their bulk providing an indication of completion of the roasting period.

A further object of the invention is to provide an apparatus for roasting coffee by this process wherein the handling of the coffee is materially facilitated and the roasting operation generally expedited.

Other objects and advantages of the invention will become apparent throughout the course of the following description.

The apparatus for carrying out my process is illustrated in the accompanying drawing, in which:—

Figure 1 is a vertical sectional view through apparatus for carrying out my process, the dotted lines indicating the position of the device when the contents of the drum are to be discharged;

Figure 2 is a plan view of the device with the hood removed;

Figure 3 is a transverse sectional view through the device with the hood in position;

Figure 4 is a detail view showing the connections of the condenser with the device;

Figure 5 is an enlarged sectional view showing the connections between the pipe 25 and the hollow shaft supporting the drum.

Referring now more particularly to the drawings, the numeral 10 indicates a suitable supporting frame including side members 11 and end members 12 and 13, the end member 12 being rigid while the end member 13 is rotatable about an axis 14 extending transversely of the frame. The end member 13 likewise forms the end member of a rectangular tilting frame 15 having its opposite end member 15ᵃ arranged adjacent to the end member 12 of the main or supporting frame 10. The end members 13, 15ᵃ have secured thereto bearings 16 for the reception of a hollow shaft 17.

Secured to the hollow shaft in surrounding relation thereto is a drum 18, the portion of the shaft lying within the drum being provided with openings 19 placing the interior of the drum into communication with the interior of the shaft. This drum has formed in one end wall thereof a manhole 20 permitting insertion and removal of coffee. That end of the shaft 17 adjacent the end member 13 of the drum is closed, as at 21, and has secured thereto a drive pulley 22 or other means whereby it may be connected with a source of power. The shaft is suitably collared, as at 23, to prevent longitudinal movement thereof.

The end member 15ᵃ of the supporting frame has secured thereto a pair of converging rigid arms 24, the ends of which are connected by a yoke 25 bolted to a conduit 26, one end of which is directed into the hollow shaft 17 and has a stuffing box connection therewith, as at 27. It will be seen that the arms 24 resting upon the end member 12 will provide a limit for downward movement of the free end of the tilting frame 15 with relation to the main or supporting frame 10 in addition to providing a support for the pipe 26. The free end of this pipe 26 is provided with a T head 28, one outlet of which connects with a gauge 29 and the opsite outlet of which connects with the steam intake 30 of a condenser 31. The main frame has associated therewith a removable metal hood 32 and a fixed pan 33, a burner 34 being arranged within the pan and beneath the drum 18.

In the use of the apparatus, coffee is placed in the drum, the burner lit and the drum rotated slowly until the gauge shows a pressure of fifty pounds. The outlet or drain 35 of the condenser is then opened slightly, care being taken that the pressure shown by the gauge does not drop below fifty pounds or does not greatly exceed fifty pounds. The water recovered from the outlet 35 of the condenser serves as a gauge for determining when the roast is completed. When 100 pounds of coffee are placed in the drum, I have found that the roast is completed when eight and one-half or nine pounds of water have been removed at the outlet of the condenser. To remove the coffee, the burner is shut off, the hood 32 removed and the manhole opened. The drum may then be elevated from the free end of the frame 15 to cause the contents thereof to pass out through the drum opening. In order that this may be accomplished without any disconnections of conduits or of any portion of the gear except those mentioned and the driving connection, a flexible tube 36 is employed for connecting the T with the condenser 31.

It will, of course, be obvious that the structure employed may be varied to a certain extent, it being merely desirable that means be provided for keeping the contents of the drum in motion so that they may not burn and for maintaining the drum under pressure generated by vaporization of the liquid contents of the coffee. It has been found that by the above system, practically nothing is removed from the coffee but water, thus leaving in the coffee all of its natural savor and preventing a loss of weight occurring when coffee is roasted by the usual process.

I claim:—

1. The process of roasting coffee consisting in subjecting the coffee, during the application of heat thereto, to a uniform pressure generated by vaporization of the liquid content of the coffee while continually removing excess vapor to maintain such pressure and condensing the same to provide a gauge for the termination of the roast.

2. The process of roasting coffee consisting in subjecting the coffee, during the application of heat thereto, to a uniform pressure of substantially fifty pounds to the square inch generated by vaporization of the liquid content of the coffee while continually removing vapor to prevent increase of the pressure to which the coffee is being subjected and condensing the same to provide a gauge for the termination of the roast.

3. Apparatus for roasting coffee including a drum to contain the coffee, a conduit leading from the drum, a vapor condenser, a connection between the conduit and the intake of the vapor condenser, a valve controlling exhaust from the condenser and means associated with the drum for determining the pressure within the drum.

4. In apparatus for roasting coffee, a support, a frame tiltable upon the support and embodying end members, bearings carried by the end members, a hollow shaft mounted in said bearings, a drum mounted about and sealed to the hollow shaft, the shaft having openings formed in the wall thereof within the drum and means supported from the support for heating the drum.

5. In apparatus for roasting coffee, a support, a frame tiltable upon the support and embodying end members, bearings carried by the end members, a hollow shaft mounted in said bearings, a drum mounted about and sealed to the hollow shaft, the shaft having openings formed in the wall thereof within the drum and means supported from the support for heating the drum, the support for said frame being at one end member of the frame, the opposite end member of the frame having arms projecting outwardly therefrom, an end member on the support upon which said arms engage to limit downward movement of the last named end member of the frame.

6. In apparatus for roasting coffee, a support, a frame tiltable upon the support and embodying end members, bearings carried by the end members, a hollow shaft mounted in said bearings, a drum mounted about and sealed to the hollow shaft, the shaft having openings formed in the wall thereof within the drum and means supported from the support for heating the drum, the support for said frame being at one end member of the frame, the opposite end member of the frame having arms projecting outwardly therefrom, an end member on the support upon which said arms engage to limit downward movement of the last named end member of the frame, a non-rotatable conduit supported from said arms and communicating with said shaft and means for rotating the shaft.

In testimony whereof I hereunto affix my signature.

EUGENE M. GANT.